United States Patent [19]

Vitagliano et al.

[11] Patent Number: 5,206,803
[45] Date of Patent: Apr. 27, 1993

[54] SYSTEM FOR ENHANCED MANAGEMENT OF PENSION-BACKED CREDIT

[76] Inventors: Francis M. Vitagliano, 117 Revere St., Boston, Mass. 02114; Franco Modigliani, 25 Clark St., Belmont, Mass. 02178

[21] Appl. No.: 670,060

[22] Filed: Mar. 15, 1991

[51] Int. Cl.$^5$ .............................................. G06F 15/30
[52] U.S. Cl. .................................... 364/408; 364/401
[58] Field of Search ................. 364/401, 408, DIG. 1, 364/DIG. 2

[56] References Cited

U.S. PATENT DOCUMENTS

| 4,648,037 | 3/1987 | Valentino | 364/408 |
| 4,742,457 | 5/1988 | Leon et al. | 364/408 |
| 4,969,094 | 11/1990 | Halley et al. | 364/408 |
| 5,083,270 | 1/1992 | Gross et al. | 364/408 |

Primary Examiner—Roy N. Envall, Jr.
Assistant Examiner—A. Bodendorf
Attorney, Agent, or Firm—Hopgood, Calimafde, Kalil, Blaustein & Judlowe

[57] ABSTRACT

A data processing pension plan monitor is directed specifically to the management and controlled access of pension-backed credit. This system permits pension plan participants to establish a line of credit (LOC), based on their vested interest in a sponsored pension plan. This LOC is thereafter systematically applied to a plurality of accounts, each permitted selected credit card and/or check writing privileges.

The present invention balances credit access with long term pension requirements. The charges associated with the credit accessed are paid back to the pensioner, thereby retaining certain tax deferred privileges while permitting access to the accumulated funds.

3 Claims, 3 Drawing Sheets

SYSTEM FOR ENHANCED MANAGEMENT OF PENSION-BACKED CREDIT

The present invention generally relates to a system permitting enhanced access to subscriber credit, and more particularly, a data processing apparatus and method for managing a plurality of accounts that can be accessed for credit tied to and in communication with an associated pension plan as an underlying source of capital.

FIELD OF THE INVENTION

There have been two recent and somewhat related developments in the field of consumer credit machinery. The first involves the rapidly changing tax codes in the U.S. and the subsequent removal of preferential tax treatment to conventional consumer debt. This has had the effect of increasing the cost of funds for consumer purchasing.

The second development is in the field of pension funding. Pension mechanisms were relatively stable items for many years and transparent to the majority of the subscribers. Pursuant to the highly volatile climate regarding sources of pension funds, such as the current crisis in the banking and insurance industries and the high profile confusion regarding social security, many individuals are taking a much greater interest in monitoring and in fact managing their own pension efforts. A corresponding effort has developed through the legislature directed to unshackling this burgeoning segment of the capital markets and expanding its availability.

The need for new lines of credit is apparent from the substantial interest fees paid by consumers for credit cards that often exceeding 20% on an annualized basis. Efforts have been made to link into traditionally inaccessible lines of credit as a means to reduce consumer credit costs. This includes the approach adopted in U.S. Pat. No. 4,718,009 to Cuervo, titled "DEFAULT PROOF CREDIT CARD METHOD SYSTEM". In that particular embodiment, the system applies credit using the cash value associated with a life insurance policy as collateral to support periodic credit needs of the policy holder. Although the system permits a flexible line of credit, the act of borrowing still was carried on in a conventional sense with a bank and/or institution, and the underlying resource was poorly utilized, thereby limiting the available savings to the consumer.

There has continued a need for a low cost line of secure credit that is not burdened with excessive administrative costs and fees.

SUMMARY AND OBJECTS OF THE PRESENT INVENTION

It is an object of the present invention to provide a system operating in conjunction with an existing pension plan to provide a pension account-backed line of credit to pension plan participants.

It is another object of the present invention to provide a data processing apparatus for managing a plurality of credit accounts, each individually associated with a separate pension plan.

It is a further object of the present invention to provide a method of establishing a line of credit for a plurality of separate accounts that is backed by a rolling pension-backed set of accounts.

The above and other objects of the present invention are realized in a data processing system that monitors a plurality of credit accounts, each associated with a participant of a pension plan. For each account, there is calculated on a periodic basis (daily) a quantity known as the Available Capital (AC). This Available Capital is derived from the current vested interest of the plan participant in his/her pension plan. Applying the Available Capital derived from the pension plan, the system monitor determines a line of credit for each plan participant. This line of credit is used to support the loans and consumer purchases made by the respective plan participant which are thereafter charged an incremental interest rate, based on a number of factors.

In accordance with the varying aspects of the present invention, the interest charged for the line of credit is paid directly to the subscriber's pension plan minus a small processing fee to fund the administrative costs. In this way, the participant is paying interest in effect to himself for the accessed funds, and pursuant to statutory considerations, the funds and collected interest remain tax deferred. The foregoing features of the present invention may be more fully appreciated in the context of a specific illustrative embodiment as described herein in conjunction with the following drawings.

DESCRIPTION OF THE PRESENT INVENTION

In summary, the present invention accesses traditional pension plan management vehicles to establish a line of credit for participant use. In this regard, the pension plan will be one analogous to a 401(K), or 403(b), or similar account type plan constructed for the accumulation of capital assets to support future pension and/or retirement needs of the plan participant. Plans of this nature may be designed with a variety of separate embellishments. For the purposes of the discussion herein, it is assumed that the plan provides separate accounts for individual participants. Each of these accounts represent an accumulated level of capital that is invested in various financial vehicles, such as stocks, bonds or other fundable assets.

There are normally three sources of income to the various pension accounts. The first is the direct contribution by the employee, usually by payroll deduction. The second source is by employer contributions, and this may be tied or in relation to the employee contribution. The last form of contribution is the return on the existing plan capital, in the form of interest and dividends. In a negative investment environment, this income may become negative. As can be seen, the Available Capital associated with a particular plan account is a fluid value that must be continually updated.

Figure 1:
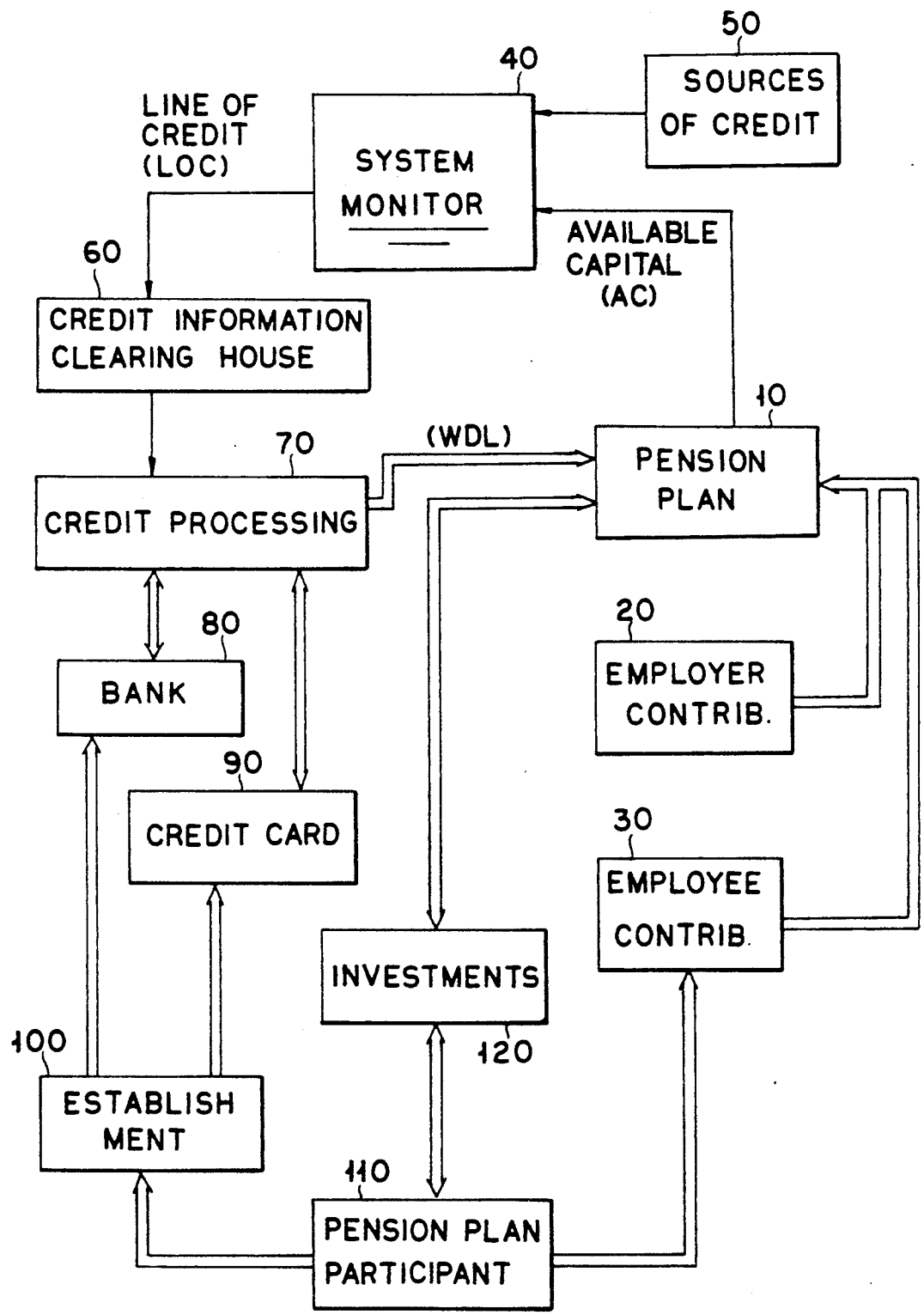
FIG. 1 depicts an information flow chart relevant to the transactional information flow path associated with the present invention.

Referring now to FIG. 1, an information flow diagram is presented starting with the pension plan, block 10. A series of pension account balances are established and updated on a periodic basis. In this regard, pension plan, block 10, and the account balances associated therewith will receive adjustments pursuant to the contributions by the employer, block 20, and the employee, block 30, as part of a regular income that may become negative. In addition, the pension plan will receive a return on an investment, including interest payments from the plan participant for accessed funds. These accumulations result in the establishment of the Available Capital (AC) for each account in the plan. The Available Capital is taken by the system monitor, block 40, and used to determine a line of credit (LOC) for each plan participant. The determination of a line of credit will be based on a measured fractional value of the Available Capital sufficient to ensure repayment and to meet any legal limits.

The line of credit is then supplied into the conventional credit information apparatus or Clearinghouse, block 60, supporting the existing network of credit card and check writing processors. In this regard, the credit information is tapped, block 70, by the credit processing organizations linked with banks, block 80, and/or separate credit card organizations, block 90. These, in turn, are linked with the services and goods supplying establishments, block 100, accepting the charges from the plan participant, block 110.

In operation, the system monitor, block 40, is linked to an individual pension plan and possibly other sources of credit, block 50. Only the vested value in the pension plan is made accessible as part of the Available Capital. This Available Capital can exist in many forms, including stocks, bonds, CDs, etc.; each of which provides a separate return to the pension plan, block 110. In addition, the pension plan is responsible for plan distributions at set intervals triggered by the working status and/or age of the plan participant.

The plan participant is provided checks and/or a credit card for use at consumer establishments, block 100, in accordance with conventional bank card and check transaction arrangements. In this way, purchases are made by check or credit card with the ensuing purchased amount first sent to credit processing, block 70, to ensure that the amount is consistent with the available line of credit then pending; if so, the purchase is approved and the purchase price withdrawn from the pension plan as an investment (WDL). This investment by the pension plan is a loan to the plan participant at the then prevailing interest rate. In this manner, the Available Capital for that account in the plan is now reduced by the WDL amount, and the plan participant is responsible to repay the WDL back to the pension plan with interest. In fact, the plan participant is merely repaying his own plan principal and interest, with the proceeds remaining tax deferred. As expressed therein, information flows from the perimeter (single) lines, while cash flows are presented as double lines.

Figure 2:
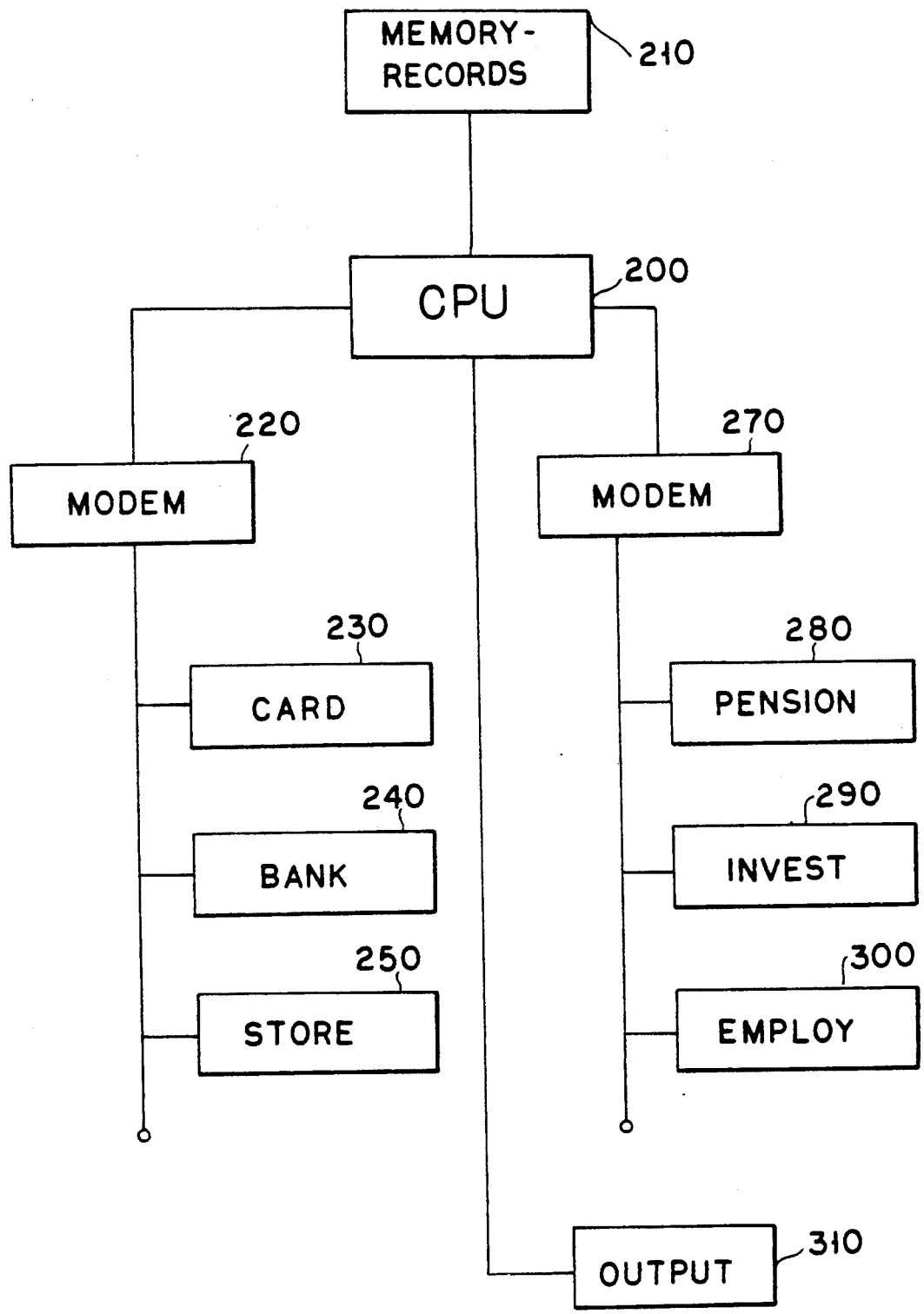
FIG. 2 depicts in block diagram format, the functional blocks associated with the system monitor of FIG. 1.

Referring now to FIG. 2, a functional block diagram is provided. The system monitor is controlled by a central processing unit (CPU), block 200, having stored program commands and instructions governing its processing responsibilities. In communication with the CPU is external memory, block 210, providing storage for account balances and plan instructions. In communication with the CPU, via modem line, block 220, are various channels to the credit information. These include credit card, block 230, bank, block 240, and various retail establishments, block 250.

On the input side, the CPU is in communication via modem, block 270, with the pension plan administrator, block 280, various investment houses, block 290, and the employer, block 300. Finally, the CPU has several report generating capabilities, including the output of periodic statements summarizing plan performance and available credit. In addition, select composite (profile) reports delineating plan spending patterns may be developed and accessed for resale to users providing important demographic information. All of this is presented via output, block 310.

Figure 3:
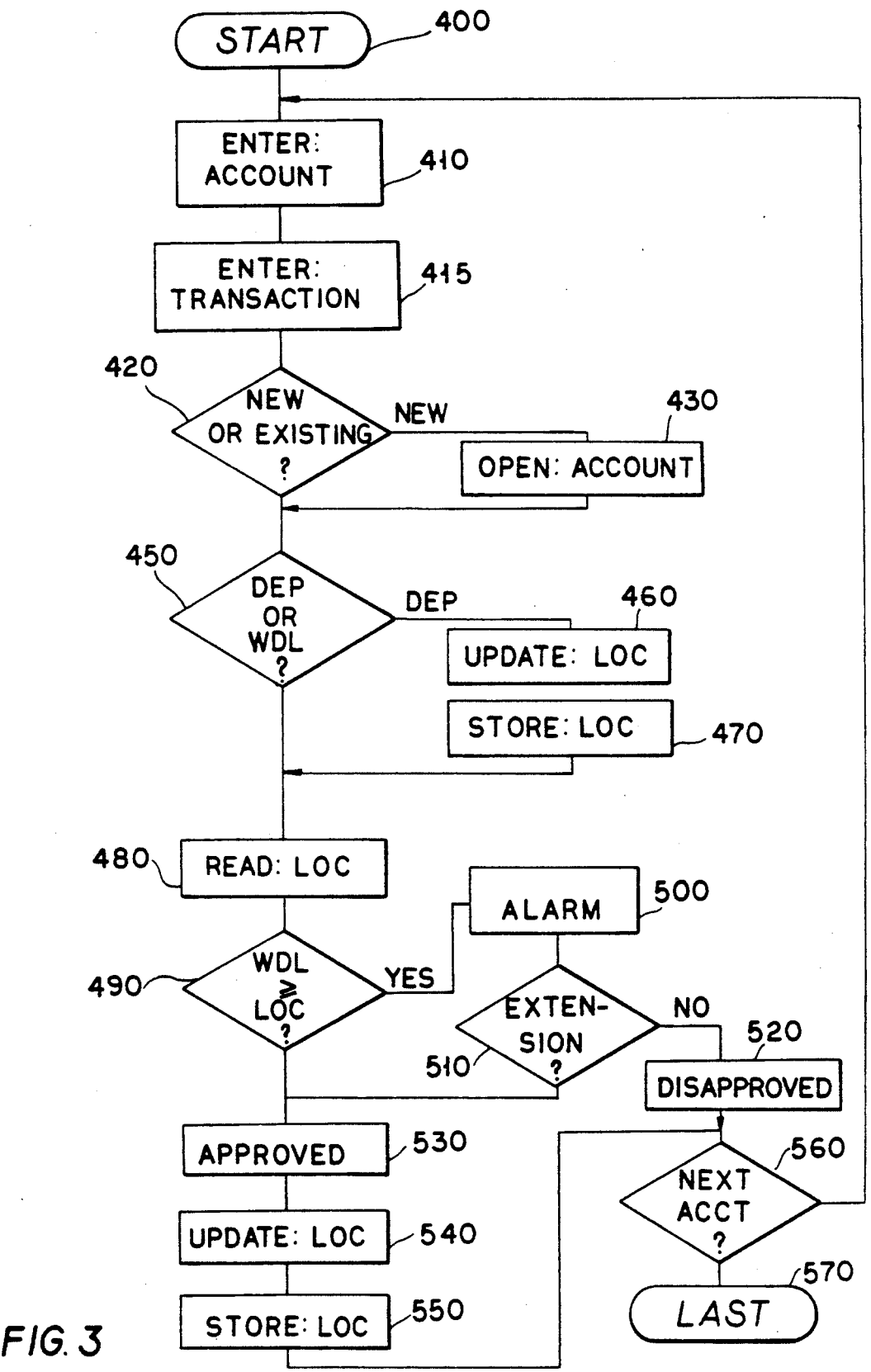
FIG. 3 is a logic flow chart depicting account management.

Referring now to FIG. 3, a logic flow chart is presented regarding the system's updating of individual accounts based on credit activity. Logic conceptually begins at block 400 and proceeds to blocks 410 and 415 where the account and transaction data are entered. At test 420, the system determines whether the account is new or exists in system memory, via comparative algorithms. If a new account is determined, logic branches to block 430 wherein the new account entry subroutine is called out. Logic returns to the main flow leading to the analysis of the inputted transaction. At test 450, the system determines whether the transaction concerns a deposit or withdrawal. If it is a deposit, logic branches to block 460 wherein the line of credit for that account is recalculated to include the assets now available through the deposit, via the following computation:

$$LOC(I,J) = LOC(I,J) + DEP(I,J) \quad \text{(I)}$$

wherein I and J are counters for the transaction period and participant account, respectively. This new line of credit is stored in accessible memory at block 470. Logic then returns to the main path and block 480 wherein the new line of credit is now accessed.

At test 490, the system compares the withdrawal WDL pertaining to the inputted transaction with the then current LOC value; if, in fact, the withdrawal is greater than the available credit ("Yes" to test 490), logic branches to alarm, block 500, triggering a warning to the system monitor. Thereafter, logic proceeds to test 510 wherein the system queries whether a credit extension will be permitted. This extension is contingent on a variety of factors, custom selected by the system monitor and will reflect the level of risk the monitor is willing to bear. If the perceived risk associated with the credit extension exceeds an acceptable level, the response to test 510 will be negative and logic will branch to block 520 disapproving the withdrawal. This information is thereafter transmitted to the credit Clearinghouse to limit continued use of the credit card and/or check writing by the participant.

Assuming a positive response to test 490 or a positive response to the extension of credit delineated in test 510, the withdrawal WDL is approved by the system, block 530, and transmitted to the credit Clearinghouse. In addition, at block 540, the available line of credit for that participant is updated and, in fact, decremented by the WDL value, via the following computation:

$$LOC(I,J) = LOC(I,J) - WDL(I,J) \quad \text{(II)}$$

The system thereafter proceeds to test 550 wherein the account and/or transaction is incremented to the next in line and logic redirected back to block 410.

The preceding discussion relates specifically to the qualification and updating of account balance information pursuant to deposits and withdrawals to the account. As illustrated, the deposits will accrue due to continued growth in pension plan assets. The withdrawal from the system will reflect individual credit card activity and/or check writing privileges for each participant.

The above-described arrangement is merely illustrative of the principles of the present invention. Numerous modifications and adaptations thereof will be readily apparent to those skilled in the art without departing from the spirit and scope of the present invention.

What is claimed is:

1. In combination in a system for the management of a plurality of pension-backed credit accounts comprising: a deposit and/or withdrawal input means for receiving select deposit and withdrawal transaction activity associated with a particular plan account; memory means for storing current vested pension account data associated with a plurality of individual pension plan participants; data processing means for receiving said deposit and withdrawal transaction activity, in conjunction with memory access means for retrieving current vested pension account data and responsive thereto for determining a level of Available Capital associated with a pension-backed credit account, approval of a requested withdrawal, if any; and account update means for adjusting a line of credit value stored in conjunction with said pension-backed credit account wherein said vested pension account data includes periodic contributions and disbursements from a pension account and said data processing means determines a level of vested interest therein pursuant to corresponding years of service for the plan participant.

2. The system of claim 1, wherein said line of credit value is implemented as a valuation of secured credit permitting distributed charges in the form of credit card or check transactions in support of consumer purchases.

3. The system of claim 1, wherein repayment of said distributed charges is made directly to said pension-backed credit account by said plan participant and said repay-ment updates said line of credit value.

* * * * *